United States Patent [19]
Trump

[11] 3,901,807
[45] Aug. 26, 1975

[54] HIGH ENERGY ELECTRON TREATMENT OF WATER

[75] Inventor: John G. Trump, Winchester, Mass.

[73] Assignee: High Voltage Engineering Corporation, Burlington, Mass.

[22] Filed: June 27, 1973

[21] Appl. No.: 374,000

[52] U.S. Cl. ................ 210/198; 21/102 R; 250/432
[51] Int. Cl. ......... A61l 3/00; C02b 1/34; C02b 3/08
[58] Field of Search ................ 210/63, 64, 96, 198; 21/54 R, 102 R; 250/432, 433, 436, 437, 438; 119/5

[56] References Cited
UNITED STATES PATENTS

| | | | |
|---|---|---|---|
| 3,128,786 | 4/1964 | Badgett | 210/96 X |
| 3,591,491 | 7/1971 | Smith et al. | 210/64 X |
| 3,779,706 | 12/1973 | Nabb | 21/54 R |

Primary Examiner—Frank A. Spear, Jr.
Assistant Examiner—Ferris H. Lander

[57] ABSTRACT

The microbiological and chemical activity of water containing microorganisms and other impurities is reduced by irradiating such water with high energy electrons. A device mixes the water with a gas to supply the water with oxygen and the water passes through a constricted region wherein the electron beam irradiates the water. The structure of the several embodiments of the constricted region results in an economical system that uniformly and sufficiently irradiates the water passing therethrough.

6 Claims, 11 Drawing Figures

3,901,807

HIGH ENERGY ELECTRON TREATMENT OF WATER

BACKGROUND OF THE INVENTION

It is frequently desired to reduce the microbiological and chemical activity of water containing microorganisms and other impurities, such as waste water and sludge. In plants for treatment of sewage one objective is the control of water pollution by properly treating the sewage before the liquid components thereof are discharged into waterways such as rivers, lakes or oceans. In a representative treatment plant raw sewage is first pretreated by coarse screening, fine screening and grit removal. Thereafter, the sewage travels a distance which may be as great as several miles and may conveniently be by gravity flow to a main pumping station which may be designed to handle maximum flows of several hundred million gallons daily. Such pumping stations deliver the sewage to the sewage treatment units. The sewage is first delivered to several sedimentation tanks which may be of the order of 100 feet wide, somewhat longer than this width and 10 feet deep. The sedimentation tanks separate the scum and sludge. The settled sludge is pumped into several thickening tanks and then brought together with recirculated sludge in several digestion tanks which may be 100 feet in diameter. An additional tank may be used for sludge storage. The liquid, minus the scum and sludge, is removed from the sedimentation tanks and passes through a chlorinator. The chlorination facility provides the disinfectant medium for controlling bacterial pollution prior to discharging the final effluent in the ocean or similar waterway.

In such a typical arrangement electron irradiation may be used to advantage at various points. Pretreatment of the sewage after it leaves the main pumping station and prior to entry in the treatment unit would have the following advantages:

1. Partial breakdown of complex micromolecules and polymeric materials, such as cellulose leading to increased biodegradability.

2. An improvement of sewage sedimentation characteristics.

3. The destruction or control of pathogenic microorganisms to minimize the transmission of pathogens from sewage treatment plants to the surrounded environment.

Another position for the electron irradiation is in the effluent streams of liquid which emerge from the sedimentation tanks. Such treatment may be used as a means of reducing the amount of chlorine needed to inactivate microorganisms and thus may be employed as a supplementary bactericidal or viridical agent. During peak load periods sewage is often bypassed directly into the streams or coastal waters without further treatment. In this case, the microbicidal application of ionizing energy at the final outflow (or at the incoming stage) would provide a useful public health safeguard.

Also electron radiation may be utilized in the treatment of sludge. Several possible applications of ionizing radiation to sludge may be envisioned. One is the pasteurization or sterilization of solids from primary or waste-activated sludge in order that the material may be used for sanitary land fills or as fertilizer. A second application concerns the improvement of the filtration characteristics of sludge by the application of irradiation.

SUMMARY OF THE INVENTION

The invention is concerned with the apparatus for conveying contaminated water through an electron beam to reduce the microbiological and chemical activities thereof. The conduit for the water is an enclosure which includes a narrow metallic duct of extended cross section, having at least one extended end thereof formed of a thin walled region permeable to high energy electrons. By having the duct in the region of the high energy electron beam economics in pumping power are achieved while providing the desired high velocity of fluid flow through the electron stream.

Before the water is irradiated, it passes through a region wherein a gas is injected into the water to reduce the density of the water. The air gas mixture increases the effective size of the duct area which further economizes the operation by permitting the use of lower energy electrons. When the gas contains oxygen, the contaminated water receives oxygen, and desirable oxidation occurs at the time of irradiation or shortly thereafter.

DESCRIPTION OF PREFERRED EMBODIMENTS

Figure 1:
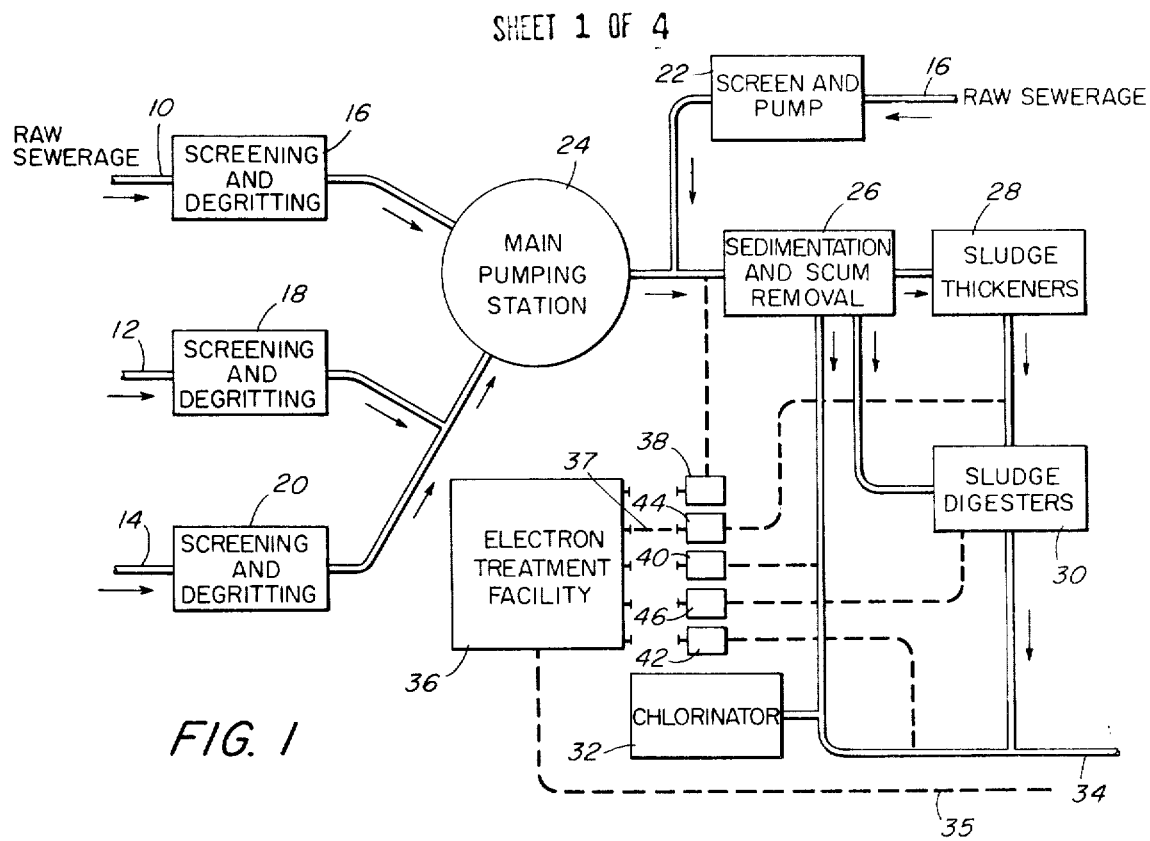
FIG. 1 is a diagram showing the incorporation of an electron treatment facility in accord with the present invention into a representative sewage treatment plant.

A typical sewage treatment plant having an electron treatment, facility in accordance with the present invention incorporated therein is diagramatically shown in FIG. 1. The sewage treatment plant includes inputs of raw sewage at various locations as at 10, 12, 14 and 16. The raw sewage then is processed through a series of screening and degritting devices 16, 18 and 20 or a screen and pump 22. The raw sewage from the screening and degritting devices then travels by gravity feed a distance which may be as great as several miles to a main pumping station 24 which may be designed to handle maximum flows of one million gallons daily.

The pumping station 24 delivers the sewage to the sewage treatment units. The sewage first passes through a sedimentation and scum removal device 26, which may include several sedimentation tanks which may be of the order of 100 feet wide, somewhat longer than this width and 10 feet deep. Scum and sludge are separated in the sedimentation tanks. The settled sludge is pumped into a sludge thickener 28 which may include several thickening tanks. Then, the sludge is brought together with recirculated sludge in a sludge digester 30 which may include several digestion tanks which may be 100 feet in diameter. An additional tank may be used for sludge storage. The liquid, minus the scum and sludge, is removed from the sedimentation tanks and passed through a chlorinator 32. The chlorination facility provides the disinfectant medium for controlling bacterial pollution prior to discharging the final effluent at 34 into the ocean or other waterways.

The electron treatment facility 36 of the present invention may treat the sewage during any of several stages in the operation of the sewage treatment plant. The apparatus which connects the electron treatment facility to the various locations in the sewage treatment plant includes a series of conduits, represented as dotted line in FIG. 1, a series of flow control devices, such as valves 38, 40, 42, 44 and 46, and a conduit 37, also shown as a dotted line which connects the output of the desired valve to the electron treatment facility. After the raw sewage or sludge is treated by the electron treatment facility, it may either flow to the ocean or other waterway through a conduit 35 or flow back to the location in the sewage treatment plant from which it originally came for further treatment. When the output of the electron treatment facility is processed back to the sewage treatment plant, it is possible to use the same conduits, shown as dotted lines, in which situation a storage vessel would be needed, or separate conduits may be used thereby allowing steady flow to and from that location in the sewage treatment plant.

The electron treatment facility 36 may advantageously treat the raw sewage which is normally first processed in the sedimentation and scum removal tanks 26. After electron treatment, the raw sewage is preferably conveyed to the sedimentation and scum removal tanks 26. Electron treatment of raw sewage partially breaks down the complex micromolecules and the polymer materials, such as cellulose, thereby leading to increased biodegradability. Electron treatment of raw sewage also improves sewage sedimentation characteristics. And lastly, pathogenic microorganisms are either destroyed or controlled thereby minimizing the transmission of pathogens from sewage treatment plants to the surrounding environment.

The effluent streams of liquid which emerge from the sedimentation tanks may also be subjected to electron irradiation. The stream may be tapped before or after it is chlorinated. Electron treatment of the liquid may reduce the quantity of chlorine needed to inactivate microorganisms and is, therefore, a supplementary bactericidal or viridical agent. Durig peak load periods sewage is often bypassed directly into streams or coastal waters without further treatment. In this case, the application of ionizing energy at the final outflow or at the incoming stage would be a useful public health safeguard.

The electron treatment facility may also treat the sludge from the sludge thickeners 28 or from the sludge digesters 30. Electron irradiation of sludge pasteurizes or radiosterilizers the solids from primary or waste activated sludge. The sludge may then be utilized either as sanitary land fill or as fertilizers. In addition, electron radiation of sludge improves the filtration characteristics of the sludge.

Figure 2:
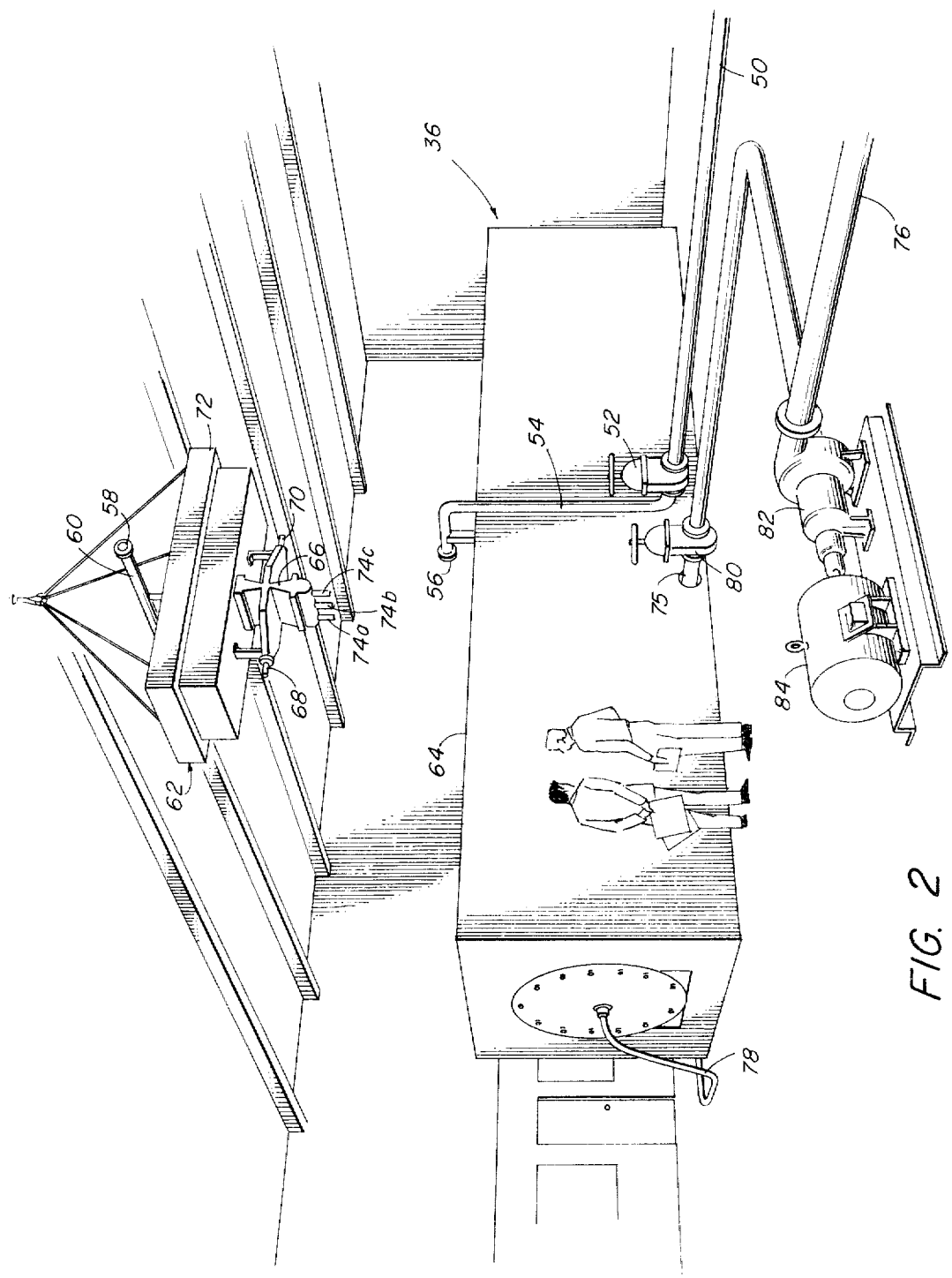
FIG. 2 is a perspective view of the electron treatment facility of FIG. 1.

FIG. 2 shown an exemplary embodiment of the electron treatment facility 36 which was only generally mentioned in the previous discussion of FIG. 1. While the electron treatment facility is described in its application in a large sewage treatment plant its use is not intended to be so limited. Electron radiation is useful in treating other liquids such as drinking water. The fluids to be treated enter the electron treatment facility 36 through a pipe 50. A valve 52 regulates the flow. A pipe 54 extends upwardly from the valve 52. An opening 56 in the pipe 54 connects to an opening 58 in a pipe 60 when an assembly 62 is lowered into an accelerator assembly 64.

In the assembly 62, high energy electrons pass through the fluids. The fluid from the pipe 60 enters an irradiating throat section 66. The throat section is generally rectangular in cross section. The longer sides remain constant throughout the section 66, but the size of the shorter sides decreases to a minimum value and then increases. At the location where the dimension is the smallest high energy electrons pass through the fluid. The electrons are generated in the accelerator assembly 64, and they pass into the through connectors 68 and 70. The electrons may pass into the fluid from both sides of the throat.

The fluid then passes through pipes 74a and 74b which in turn connect to a pipe 72 (shown in FIG. 3) when the assembly 62 is in operative position; the pipe 72 in turn connects to a pipe 75. A valve 80 regulates the fluid flow. An output pipe 76 passes the fluid out of the electron treatment facility. A pump 82 which is driven by a motor 84 assists in conveying the fluid. A conduit 78 supplies electrical power to the accelerator. A housing 71 may include a device for injecting a gas into the fluid before it is subjected to irradiation.

Figure 3:
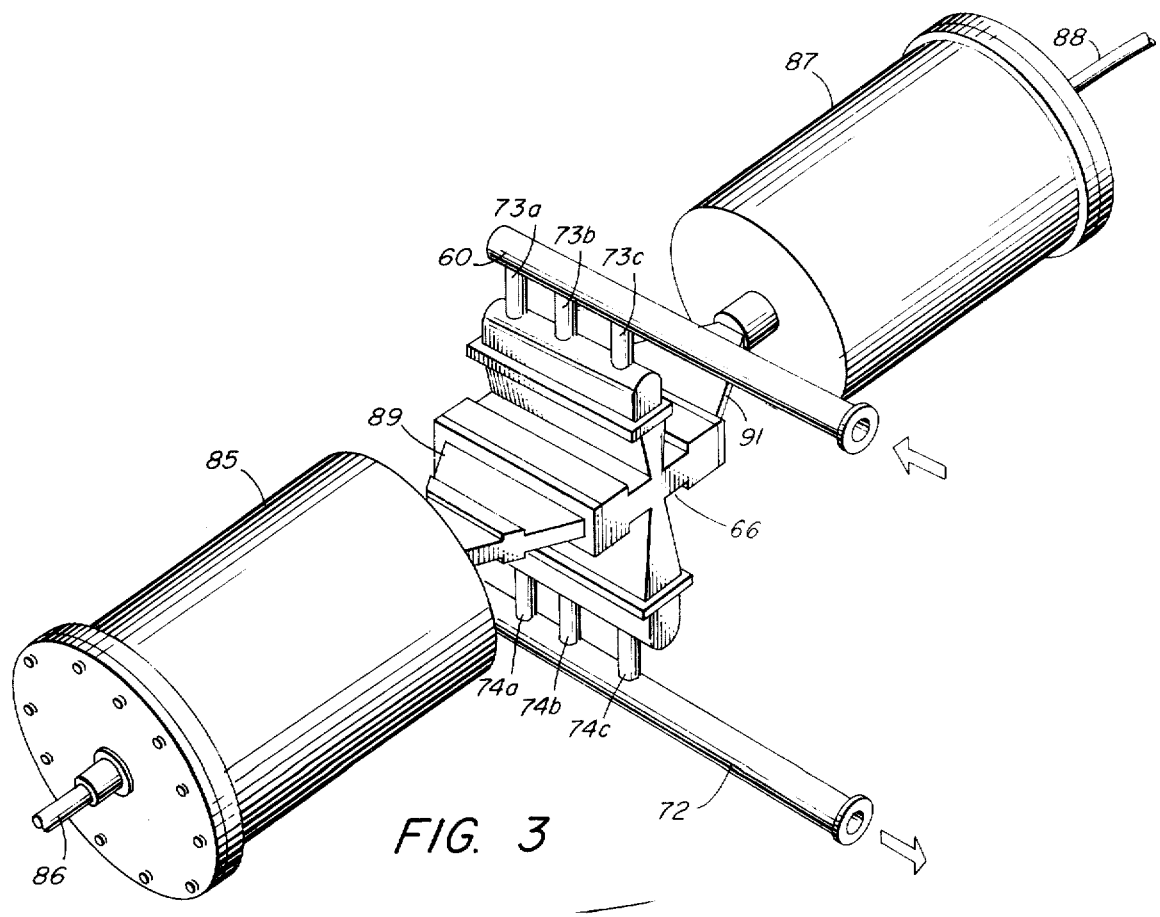
FIG. 3 is a perspective view of the electron irradiation region of the conduit and a portion of the electron accelerators.

FIG. 3 shows the irradiating throat section 66 in more detail. The fluid passes through the pipe 60 and then branches into one of three smaller pipes 73a, 73b, or 73c. These three pipes uniformly distribute the fluid over the length of the throat section 66. The pipes 74a, 74b and 74c convey the irradiated fluid to the pipe 72.

High energy electrons may enter the fluid from two opposing sides. In this case, a pair of electrical accelerators contained within grounded metal tanks 85 and 87 and supplied with electrical power through input cables 86 and 88 may be used to produce two oppositely directed beams of high energy electrons. As the electrons pass through outwardly flaring enclosures 89 and 91, they are rapidly deflected back and forth by magnetic means thereby allowing the electron beams to scan the length of the throat. Preferably, these enclosures are extensions of the evacuated electron acceleration tube and these contain residual gas at a pressure of less than $10^{-4}$ Torr.

High energy electrons may however in some cases be converted to allow the scan of the electron beams to emerge through a long thin metal window closing the end of the flared enclosures into air or other gas at essentially atmospheric pressure and then continue on to enter the thin-walled region 116 so as to pass into the fluid material.

Figure 4:
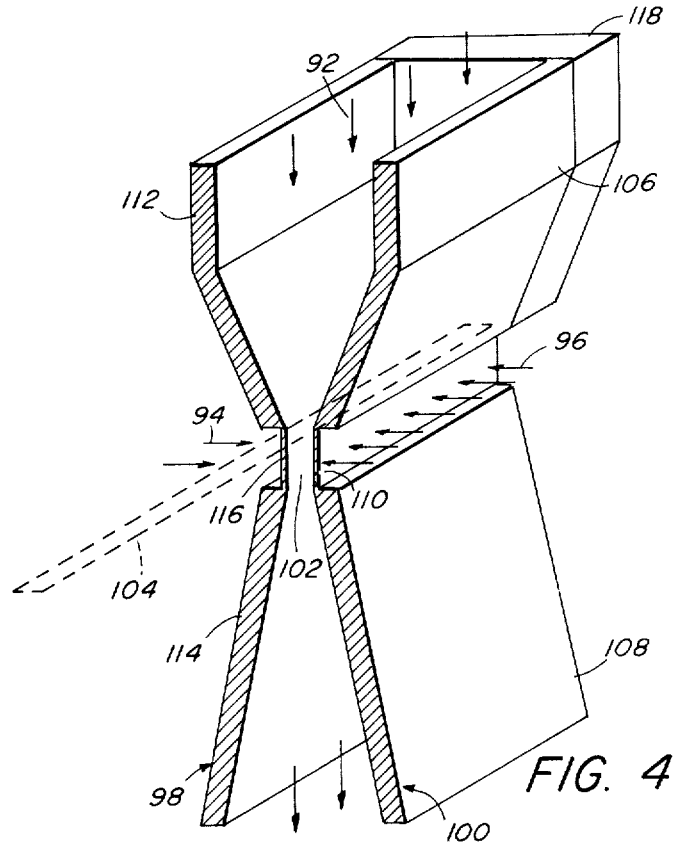
FIG. 4 is a sectional view of one form of a duct in accordance with the invention.

FIG. 4 shows in partial section an irradiating throat section for electrons of energies greater than 300,000 electron volts. The section is suitable for irradiating incoming drinking water, river water, wastewater or waterborne sludge. High energy electrons penetrate the fluid from the two sides of the section as indicated by the arrows 94 and 96. The fluid flows in the direction of the arrows 92.

The irradiating throat of FIG. 4 has a pair of side walls 98 and 100 that flare outwardly at both their ends and form a narrow center region 102. Thus, a narrow slot 104 (shown in dotted lines) of generally rectangular shape is formed that has both a very narrow and a substantially extended dimension. The side wall 100 includes an upper plate 106 and a lower plate 108 which are formed from a metal, such as aluminum or stainless steel, and a thin-walled, electron permeable region 110, such as aluminum foil. Similarly, the side wall 98 includes an upper plate 112, a lower plate 114 and a thin-walled, electron permeable region 116. An end wall 118 (shown partially) an an oppositely disposed end wall (not shown) form a complete enclosure for the fluid passing through the section.

Thus, the thin-walled region 102 forms the throat of a Bernoulli type configuration. According to Bernoulli's principle, the fluid travels at higher velocity and lower pressure in the vicinity of the electron irradiation than in the region having a greater cross-sectional area. The resulting fluid velocity and pressure is well suited to the dose distribution of high energy electrons. The imposed distribution of electrons is such as to produce an approximately uniformly absorbed radiation does throughout the irradiated fluid volume as it moves past the region 102. The cross-sectional area of the irradiating section increases steadily as the distance from the region 102 increases; preferably, the cross-sectional area is greatly increased to at least four times the area of the slot 104.

Figure 5:
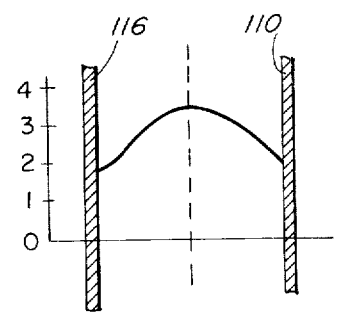
FIG. 5 is a graph showing the ionization density distribution produced by the electrons in the duct of FIG. 4.

FIG. 5 depicts the relative ionization density distribution produced by the electrons as a function of the distance across the region 102. By adjusting the voltage of the electron accelerator, the ionization density may reach its maximum value in the plane approximately midway between the inner surfaces of the thin-walled, electron permeable metal 116 and 110 where the fluid velocity is highest.

Figure 6:
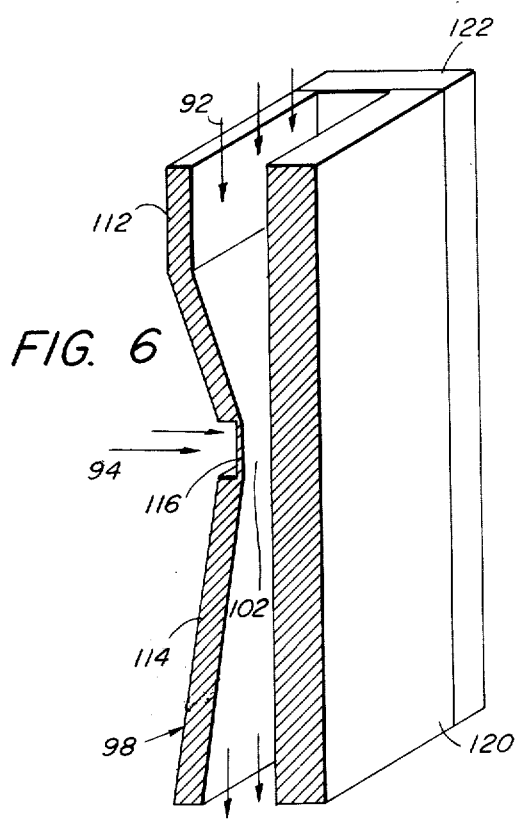
FIG. 6 is a sectional view of another form of a duct in accordance with the invention.

FIG. 6 shows the structure of the irradiating throat section when only one side of the section is subjected to a high energy electron beam. Electron beams with energies greater than 300,000 electron volts irradiate the fluid in the region 102 from the direction of the arrows 94. A straight, metallic wall 120 is disposed across the region 102. Preferably, the wall 120 is fabricated from a metal, such as tungsten, that is not permeable to electrons. Thus, electrons crossing the region 102 and striking the surface of the wall 120 reflect back into the fluid due to elastic nuclear scattering. An end wall 122 and an oppositely disposed end wall (not shown) form the complete enclosure for the fluid.

Figure 7:
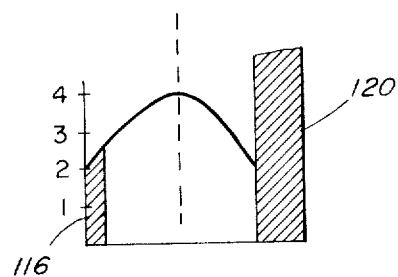
FIG. 7 is a graph showing the relative ionizationdensity distribution produced by the electrons in the duct of FIG. 6.

The curve in FIG. 7 depicts the relative ionization density distribution as a function of position within the region 102 of the throat section of FIG. 6. The high energy electrons which are emitted from one side of the throat section and the elastic nuclear scattering effect which occurs at the surface of the electron reflective wall 120 produce a curve having a maximum ionization density at the midplane of the region 102.

Figure 8:
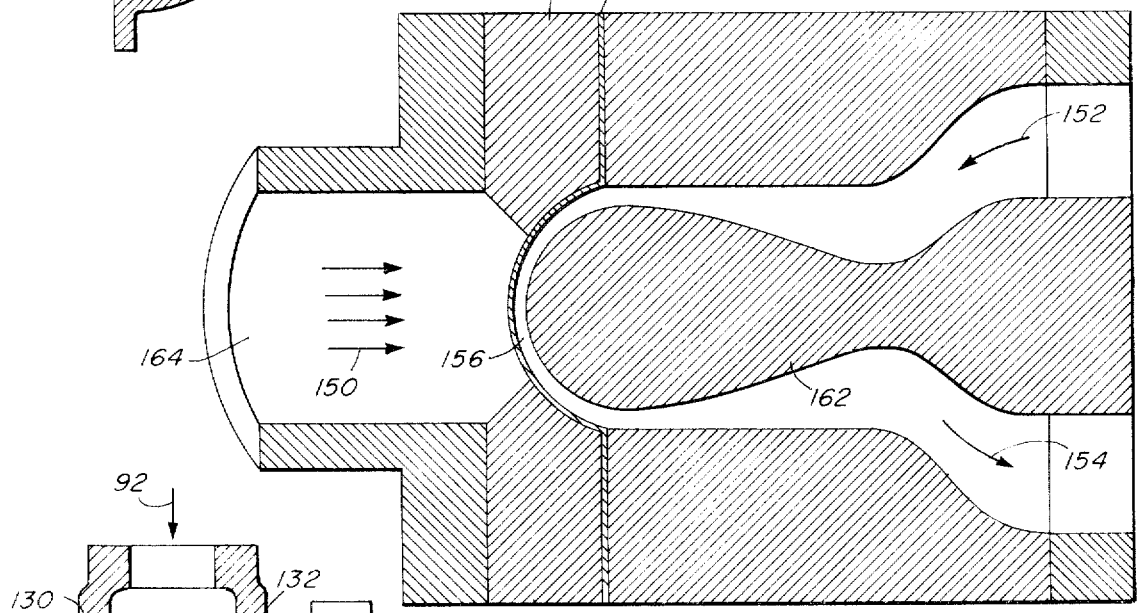
FIG. 8 is a sectional view of a water-gas mixer in combination with a duct.

An important feature of the present invention is mixing the fluid with a gas before irradiation of the fluid. FIG. 8 depicts one embodiment that performs this feature. The details of the irradiating throat section are similar to the throat section of FIG. 4. However, a fluid-gas mixing chamber 124 is formed from metallic walls 126 and 128. A gas is introduced into the mixing chamber 124 through a pair of openings 130 and 132. An arrow 92 indicates the direction of incoming water, wastewater or water-borne sludge, and an arrow 138 indicates the motion of the irradiated fluid. The gas may be stored in one or more suitable containers, such as at 134. A conduit 136 joins the gas container to the mixing chamber 124. The gas may be air at supra atmospheric pressure, oxygen, chlorine, or a combination.

Other irradiating throat sections, such as the section in FIG. 6 for electron irradiation from only one side of the section, may have the feature of the gas-fluid mixing prior to irradiation.

Figure 9:
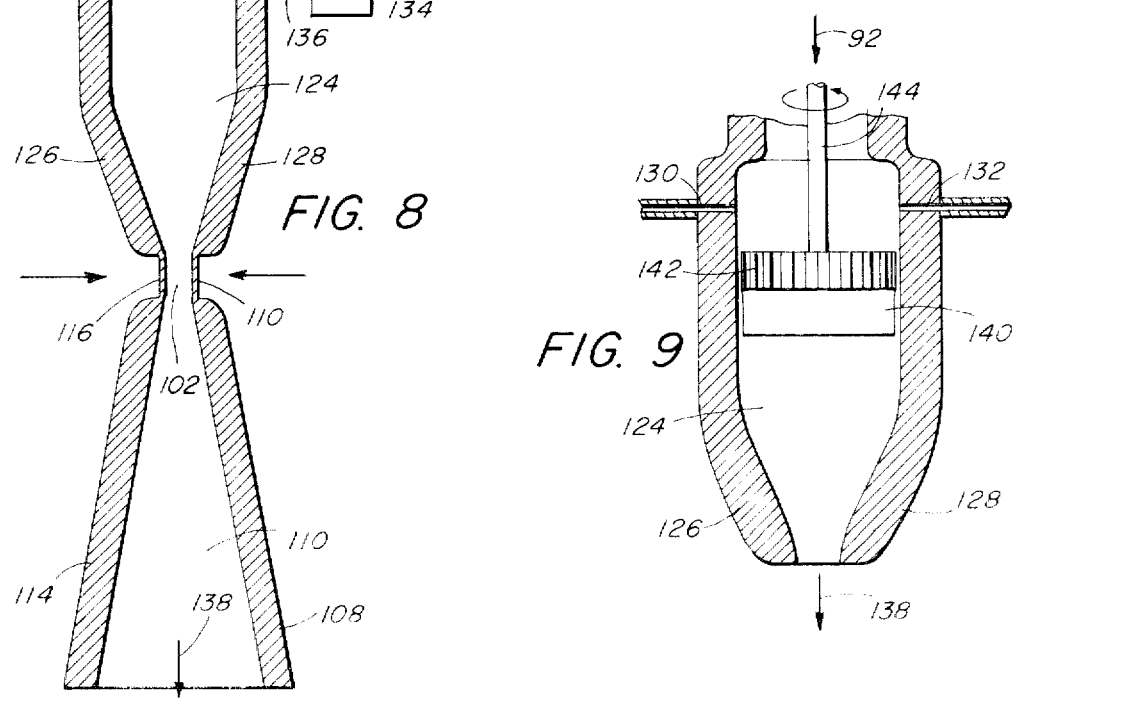
FIG. 9 is a sectional view of an alternative embodiment of the mixer of FIG. 8.

An agitator may be disposed in the mixing chamber to either mix the gas and fluid more effectively or to break up solid particles that may be entrained in the fluid. In FIG. 9 for example, a grinder 140 having a plurality of grinding elements, such as teeth 142, is disposed within the mixing chamber 124. The grinder rotates about a shaft 144 which is driven by a suitable driving means such as an electric motor (not shown). Either gaseous or liquid additives may be inserted into the mixing chamber 124 through a pair of openings 130 and 132.

Figure 10:
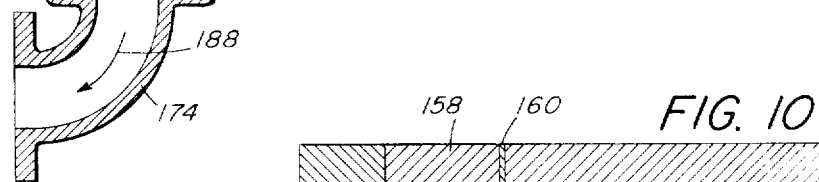
FIG. 10 is a partial sectional view of another form of a duct according to the invention.

FIG. 10 depicts an alternative structure for a throat section for irradiating watery sludge or wastewater. This section functions with accelerators which generate energies down to 500,000 electron volts and may clamp directly onto an electron scanner for direct vacuum to sludge treatment.

Arrows 150 depict the direction of the electron beam which, as in FIG. 6, is from only one direction, and the arrows 152 and 154 show the direction of fluid flow before and after irradiation, respectively. This section also operates in accordance with Bernoulli's principle; the cross-sectional area for fluid flow is substantially decreased at 156 thereby creating a region wherein the fluid has high velocity and low pressure. Electron irradiation occurs at 156. The section includes a portion 158 that is shaped to take a thin metal sheet 160 with only uni-directional bending. The sheet 160 is an electron permeable material, such as titanium or stainless steel, and the sheet may simply be clamped in without distortion. A rounded metal section 162 reflects electrons back into the fluid. A chamber 164 may enclose air or a partial vacuum. This irradiating throat section has considerable X-ray shielding.

Figure 11:
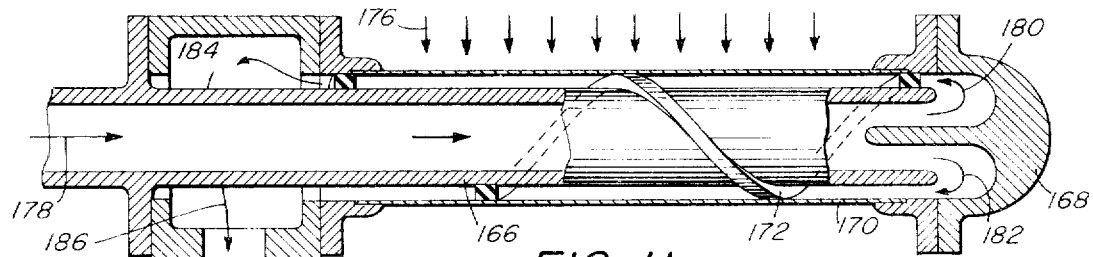
FIG. 11 is a partial sectional view of still another form of duct in accordance with the invention.

FIG. 11 shows another embodiment of an irradiating throat section. The design is particularly suitable for low energy electrons of about 500,000 electron volts and high doses of approximately $10^6$ rad as would be suitable in small wastewater and sludge units. This section has an open-ended cylinder 166, and end cap 168, an outer cylinder 170 which is concentric with the cylinder 166, a continuous spiral spacer 172 between the cylinders and an outlet channel 174. The scanned electron beam is represented by the arrows 176. The end cap 168 is removable to facilitate inspection and servicing. The cylinder 170 is made of an electron permeable material, preferably titanium or stainless steel, at least in the region of the arrows 176. Preferably, the cylinder 166 is made of a material, such as tungsten, that reflects electrons back into the fluid.

In operation, the fluid enters this irradiating throat section in a direction shown by an arrow 178, enters the region between the cylinders, (arrows 180 and 182), undergoes spiral motion due to the spacer 172 and then leaves the section (arrows 184, 186 and 188). The fluid between the cylinders has moderate pressure, high velocity and spiral motion to insure fairly uniform dosage. The electron beam, of course, traverses the fluid thickness between the cylinders.

The theory of operation of the electron treatment facility of the present invention is as follows. In the radiation treatment of wastewater and sludge, it is necessary not only to reduce to acceptable levels the contents of microorganisms and parasites, but also to supply the oxygen required by the dissolved and solid organic content.

The oxygen requirements are referred to as biological oxygen demand (BOD) and chemical oxygen demand (COD). BOD refers to the oxygen demand within a material that will be utilized by the life processes of organisms. COD, on the other hand, is a more inclusive measurement that refers to the total oxidizable potential of the material. COD is typically two to three times the BOD value.

Because of the high variability of sewage and sludge, precise stoichometric determination of the required oxygen is not appropriate although such calculations may be expressed in principle. A rough approximation of the oxygen demand is that the oxygen in from 0.5 to 2.0 cubic feet of air at atmospheric pressure is required to oxidize the oxidizable components of one gallon of sludge with a 5% solids content.

To utilize electron radiation of sludge and wastewater to reduce by sterilization the microorganisms and parasites, a sufficient dose of electrons for the fluid is necessary and tremendous quantities of wastewater must be handled by a typical water treatment facility. Normally, irradiation of large volumes of wastewater from moderate or large municipal wastewater facilities would require electron energies of at least two million electron volts. Even so, the maximum thickness of unit density water which can be irradiated would be about 1.50 centimeters.

In the present invention, the effective thickness of the water which may be uniformly irradiated is increased, thereby increasing the effective linear penetration of electrons at a given energy, and the requirement of oxygen is satisfied by the production of a low density, air-water emulsion near to or above atmospheric pressure immediately prior to irradiation.

The low density, water-air emulsion does not, of course, increase the weight of liquid or solid material that is irradiated, but it does permit the use of apertures of more practical dimension. Moreover, any ionizing energy which is absorbed by the oxygen or air itself is converted in part into ozone and hydrogen peroxide and other ionized and activated ingredients which in turn react on the water molecules and their solid contents to expedite the radiation effects.

Thus, the conversion of the approximately unit density wastewater and sludge to a flowing, air saturated medium of density less than one half this value and conceivably approaching one-fifth or one-tenth this value correspondingly increases the effective linear range of the available electrons at a given energy and contributes greatly to the effectiveness of the radio-chemical and radio biological effect.

For example, in FIG. 8, the injection of the gas into the mixing chamber results in a reduction by one half of the average density of the fluid. Thus, the penetration of the electrons in the region 102 is correspondingly increased by at least a factor of two over what the penetration would have been if the gas were not mixed with the fluid. Also, the geometry of the construction and the distribution and energy of the injected electrons in such that the absorbed energy through the gas-fluid mixture is within a factor of two of the average absorbed energy. The electron energy is in excess of 300,000 electron volts. The expansion of the cross-sectional area away from the region 102 is at least by a factor of four over the area of the constricted region.

I claim:

1. An apparatus for increasing the thickness of water and water-borne sludge which may be penetrated by electrons of a given energy and for the optimization of the radio-chemical and radio-biological effects of such penetration by such electrons on such water and water-borne sludge, including at least one machine source of a continuous beam of electrons, a metal enclosed region adapted to receive the water and water-borne sludge and transit the water and water-borne sludge therefrom, means for injecting an oxygen containing gas into the metal enclosed region at a rate sufficient to diminish the average density of the water and water-borne sludge by at least a factor of two and to augment that percentage of the total chemical oxygen demand of the water and water-borne sludge present in the water and water-borne sludge mixture which is supplied by available oxygen, a constricted region whose cross-section perpendicular to the direction of water flow is generally a narrow but extended rectangle, at least one extended side thereof being formed of a thin metal wall, the non-extended sides thereof being of a length less than the maximum range of the electrons emitted by the machine source in the gas containing water, and means for injecting the high energy electrons through the thin walled regions substantially uniformly along the length dimension thereof and into the gas containing water, the penetration of the electrons into said gas containing water being increased by at least a factor of two over that possible in the water alone, the geometry of the constricted region and the distribution and energy of the injected electrons being such that the absorbed energy throughout the gas containing water is within a factor of two of the average absorbed energy, and the radiation effect of the electrons being optimized by the presence of sufficient oxygen.

2. The apparatus according to claim 1 wherein the gas is air at supra atmospheric pressure.

3. The apparatus according to claim 1 wherein the gas contains oxygen.

4. The apparatus according to claim 1 wherein the electrons have energies in excess of 300 kilo electron volts.

5. The apparatus according to claim 1 further including means positioned in the metal enclosed region for mechanically stirring the water to assist in the dissolution of the gas into the water and to break up large particles within the water.

6. The apparatus according to claim 1 wherein the region beyond the constricted region expands gradually into a cross-sectional area at least four times the area of the constricted region.

* * * * *